US011163358B2

(12) United States Patent
Marks et al.

(10) Patent No.: US 11,163,358 B2
(45) Date of Patent: *Nov. 2, 2021

(54) SPECTATING VIRTUAL (VR) ENVIRONMENTS ASSOCIATED WITH VR USER INTERACTIVITY

(71) Applicant: Sony Interactive Entertainment Inc., Tokyo (JP)

(72) Inventors: Richard Marks, Pleasanton, CA (US); Steven Osman, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,434

(22) Filed: Mar. 16, 2017

(65) Prior Publication Data

US 2017/0269685 A1    Sep. 21, 2017

Related U.S. Application Data

(60) Provisional application No. 62/309,882, filed on Mar. 17, 2016.

(51) Int. Cl.
*G06F 3/01* (2006.01)
*A63F 13/26* (2014.01)
(Continued)

(52) U.S. Cl.
CPC ............ *G06F 3/013* (2013.01); *A63F 13/212* (2014.09); *A63F 13/26* (2014.09);
(Continued)

(58) Field of Classification Search
CPC .. A63F 13/335; A63F 13/5258; A63F 13/533; A63F 13/86; A63F 2300/303;
(Continued)

(56) References Cited

U.S. PATENT DOCUMENTS

| 5,604,848 A | 2/1997 | Harada et al. ................ 395/119 |
| 2007/0117617 A1* | 5/2007 | Spanton .................. A63F 13/12 463/29 |

(Continued)

FOREIGN PATENT DOCUMENTS

| EP | 1 117 074 A2 | 7/2001 | ............. G06T 15/20 |
| WO | WO 2016/009864 A1 | 1/2016 | ......... H04N 21/2343 |

OTHER PUBLICATIONS

Landfall, Spectator zoom and player rotation follow model, May 18, 2015, YouTube, pp. 1-3, time segment 0:00-0:14 (Year: 2015).*

(Continued)

*Primary Examiner* — Kenneth Bukowski
(74) *Attorney, Agent, or Firm* — Penilla IP, APC

(57) ABSTRACT

A method, system, computer readable media and cloud systems are provided for generating views of a virtual reality environment for a spectator. One example method includes generating a virtual reality environment to be rendered for a head mounted display (HMD) of an HMD player. The HMD player is provided with an HMD view that is controlled by movement of the HMD by the HMD player. Then, providing a spectator view into the virtual reality environment. The spectator view is associated with a viewing spot directed into the virtual reality environment. The viewing spot is decoupled from the HMD view. In some examples, multiple viewing spots are pre-authored and the spectator is provided with different ones of the viewing spots as the HMD players move around the virtual reality environment.

16 Claims, 11 Drawing Sheets

(51) Int. Cl.
  A63F 13/5252   (2014.01)
  A63F 13/86     (2014.01)
  A63F 13/212    (2014.01)
  A63F 13/533    (2014.01)
  G06F 3/0346    (2013.01)
(52) U.S. Cl.
  CPC ........ *A63F 13/5252* (2014.09); *A63F 13/533* (2014.09); *A63F 13/86* (2014.09); *G06F 3/0346* (2013.01); *A63F 2300/303* (2013.01)
(58) Field of Classification Search
  CPC ....... A63F 2300/407; A63F 2300/8082; G06F 3/013; G06F 3/0346
  See application file for complete search history.

(56) References Cited

U.S. PATENT DOCUMENTS

| | | | | |
|---|---|---|---|---|
| 2007/0117635 | A1* | 5/2007 | Spanton | A63F 13/12 463/43 |
| 2009/0209347 | A1* | 8/2009 | Roberts | A63F 13/12 463/40 |
| 2010/0007582 | A1* | 1/2010 | Zalewski | A63F 13/00 345/8 |
| 2013/0222215 | A1 | 8/2013 | Kobayashi | 345/8 |
| 2014/0113718 | A1* | 4/2014 | Norman | A63F 13/12 463/31 |
| 2014/0364208 | A1 | 12/2014 | Perry | 463/31 |
| 2016/0054798 | A1 | 2/2016 | Messingher et al. | G06F 3/014 |
| 2017/0249785 | A1* | 8/2017 | Hooper | A63F 13/335 |

OTHER PUBLICATIONS

Psyonix_Corey, New Spectator AutoCam Options Info, Mar. 7, 2016, Reddit, pp. 1-5 (Year: 2016).*
Feltham, Jamie, *VR v. Third-Person,* Feb. 18, 2014, VR/focus, pp. 1-4 (Year: 2014).*
Unknown, "Head-mounted display—Wikipedia", Mar. 15, 2016, XP055387241, pp. 1, 3-4, 6. https://en.wikipedia.org/w/index.php?title=Head-mounted_display&oldid=710152704.
PCT International Search Report, dated Oct. 7, 2017, PCT/US2017/022983.
PCT/US2017/022977, International Search Report, dated Jun. 21, 2017.
PCT/US2017/023007, International Search Report, dated Dec. 6, 2017.
B.Kuchera, "How Job Simulator created a perfect way to spectate, and stream, from within VR", Mar. 30, 2016, XP-002770982, Dec. 6, 2017, https://www.polygon.com/2016/3/30/11330766/job-simulator-vive-twitch-youtube.
Simon et al., "Multi-viewpoint Images for Multi-User Interaction", Virtual Reality 2005, Proc. VR 2005 IEEE, Germany, Mar. 12-16, 2005, pp. 107-113, XP031572867, ISBN: 978-0-7803-8929-8.
JP App. 2018-549158, Reasons for Refusal, English translation, Dispatch No. 475306, Nov. 19, 2019.

* cited by examiner

| Spectator(s) | Multimedia VR Content | Pre-Authored Viewing Spots | Interesting Objects O |
|---|---|---|---|
| User 1 | Game 1 | Spot 3 ↓ Spot 6 ↓ Spot 9 ↓ Spot N | 01, 03<br>06, 04, 05, 010<br>012, 013, 011, 014<br>... |
| User 2 | Game 1 | Spot 1 ↓ Spot 4 ↓ Spot 9 ↓ Spot N | 01, 02, 03<br>06, 04, 05<br>012, 013, 011, 014<br>... |
| User 3 | Environment 1 | Spot X ↓ Spot N | ... |
| User 4 | Environment N | Spot Y ↓ Spot N | ... |
| User N | Content N | Spots N | Objects (O) N |

FIG. 7

| HMD VR Player | Spectator(s) View Position | HMD VR Player Sees | Spectator(s) Sees | Spectator(s) Sees more than HVP |
|---|---|---|---|---|
| HVP View 1 | S-View 1 | HVP View 1 | HVP View 1 | HVP View 1 |
| HVP View 2 | S-View 1 | HVP View 2 | HVP View 2 | HVP View 2 |
| HVP View 3 | S-View 2 | HVP View 3 (A) | HVP View 3 (A) | Also Sees B A + B |

SPECTATING VIRTUAL (VR) ENVIRONMENTS ASSOCIATED WITH VR USER INTERACTIVITY

CLAIM OF PRIORITY

This application claims priority to U.S. Provisional Patent Application No. 62/309,882, filed on Mar. 17, 2016, entitled "Spectating Virtual Reality (VR) Environments Associated with VR User Interactivity," which is herein incorporated by reference.

FIELD OF THE DISCLOSURE

The present disclosure relates to virtual reality (VR) environment content presented in head mounted displays (HMDs), and methods and systems for integrating access to VR environments by spectating users and methods for enabling users to spectate dynamically changing environments being navigated by HMD users that interact in VR environments, and associated apparatus and methods.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

It is in this context that embodiments of the disclosure arise.

SUMMARY

Implementations of the present disclosure include methods and systems that are used for enabling spectating virtual reality environments and content being encountered, viewed and/or interfaced with by HMD users. In some embodiments, methods and systems are described that enable users to spectate in a VR user's VR environment via pre-authored spots/locations in the virtual reality space. In another embodiment, a spectating mode enables a user to use a VR user's gaze direction to focus or identify specific locations within VR environment. By way of example, a gaze direction of the VR user can identify some location within the VR environment that the spectator can identify. In another embodiment, audio controls are adjusted and/or modified to enable a spectator to focus his listening to specific locations within VR environment of VR user. For example, the spectating user can decide that some location within the VR environment is interesting, and sounds to the spectating user can then be adjusted to provide the spectating user sounds that would surround the spectating user, as if the spectating user is actually located at that identified VR environment location.

In one embodiment, a method for generating views of a virtual reality environment for a spectator is provided. The method includes generating a virtual reality environment to be rendered for a head mounted display (HMD) of an HMD player. The HMD player is provided with an HMD view that is controlled by movement of the HMD by the HMD player. Then, providing a spectator view into the virtual reality environment. The spectator view is associated with a viewing spot directed into the virtual reality environment. The viewing spot is decoupled from the HMD view. In some examples, multiple viewing spots are pre-authored and the spectator is provided with different ones of the viewing spots as the HMD players move around the virtual reality environment.

In some embodiments, movement of the HMD changes the HMD view, and wherein having the viewing spot of the spectator view decoupled produces a delayed movement of the viewing spot to follow the HMD view.

In some embodiments, the delayed movement of the viewing spot functions to follow the HMD view at a slower rate than movements of the HMD.

In some embodiments, the viewing spot is one of a plurality of viewing spots associated with the virtual reality environment.

In some embodiments, select ones of the viewing spots are selected for the spectator view.

In some embodiments, select ones of the viewing spots are selected for the spectator based on specific content identified to be interesting in the virtual reality environment.

In some embodiments, the spectator view is part of the HMD view.

In some embodiments, the spectator view is greater than the HMD view.

In some embodiments, a gaze direction of the HMD player is used to identify content being viewed by the HMD player to the spectator.

In some embodiments, the method further includes receiving selection of a listening zone in the virtual reality environment by the spectator, wherein selection of the listening zone provides audio to the spectator from a perspective of the listening zone.

In another embodiment, a method executed by a server for generating views of a virtual reality environment for a spectator is provided. The method includes receiving, by the server, a feed of a virtual reality environment rendered for a head mounted display (HMD) of an HMD player. The HMD player is provided with an HMD view that is controlled by movement of the HMD by the HMD player. The feed of the virtual reality environment is shared to a website. The method also includes receiving, by the server, a request from the spectator to access the virtual reality environment from the website. Then, sending, by the server, a spectator view into the virtual reality environment to a device of the spectator. The spectator view is associated with a viewing spot directed into the virtual reality environment, and the viewing spot is decoupled from the HMD view. The spectator view is updated to other viewing spots directed into the virtual reality environment as the HMD player moves around the virtual reality environment.

In some embodiments, the viewing spots are pre-authored viewing spots that are selected to provide interesting views into the virtual reality environment as the HMD player traverses the virtual reality environment.

In some embodiments, spectator is popped from one to another of the pre-authored viewing spots.

In some embodiments, a profile of the spectator identifies a preference for a type of view or content, and the preference is used to select which ones of the pre-authored viewing spots are provided to the spectator.

In some embodiments, the device of the spectator is one of an HMD used by the spectator or a television screen used by the spectator, or a computer screen used by the spectator, or hand-held device screen used by the spectator.

In some embodiments, the spectator is one of a plurality of spectators that provides access to view the HMD view of the HMD player.

In some embodiments, the website provides a selection of options of other HMD views of other HMD players, such that the spectator can select specific ones of the HMD views and see the respective virtual reality environments from one or more spectator views.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 7 illustrates an example of how different spectators can be provided with different pre-authored viewing spots into multimedia VR content, and association of interesting objects to be viewed from the perspective of specific viewing spots, in accordance with one embodiment.

DETAILED DESCRIPTION

Figure 1:
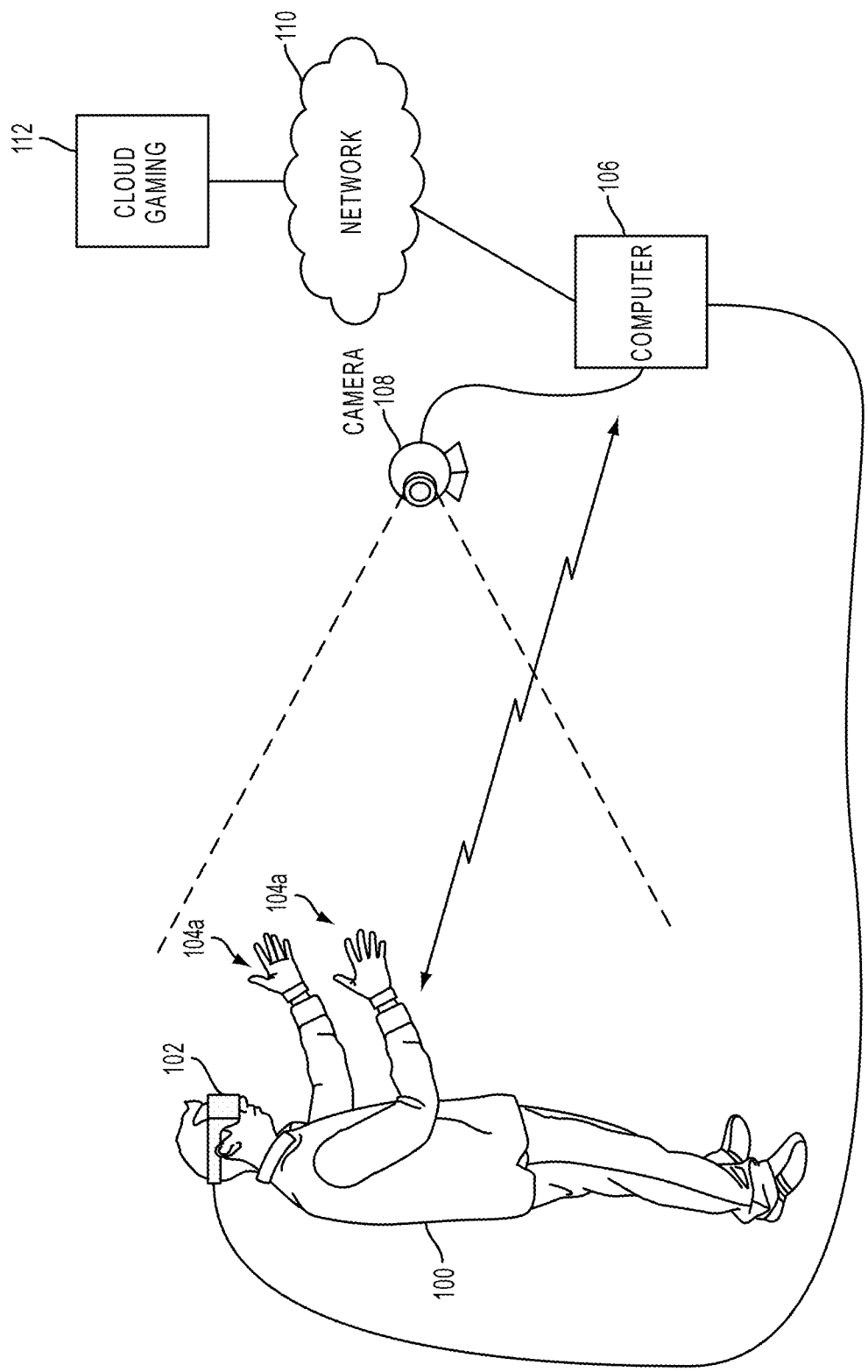
FIG. 1 illustrates a system for interactive gameplay of a video game, in accordance with an embodiment of the disclosure.

The following implementations of the present disclosure provide methods, systems, computer readable media and cloud systems, for providing spectators of HMD player's customized views that improve the experience of spectators. In one embodiment, spectators are provided with the ability to select a particular virtual reality (VR) environment to view, e.g., such as one being generated in response to an HMD player. Spectators, in one embodiment, are provided with new views and perspectives into the virtual reality environment, which may be pre-authored. Pre-authoring of virtual reality viewing spots within the virtual reality environment can facilitate spectators to view or focus on interesting content within the virtual reality scene, as navigated by an HMD player. In one embodiment, more than one viewing spot can be pre-authored within different locations in areas of a game, content, multimedia, or generally content being navigated by the HMD player. These views can be preselected, and assigned to the spectator based on the navigation by the HMD player.

In one embodiment, these views can be provided in a smooth presentation format, which are not hard-tied or locked to the exact viewing direction of the HMD player. Furthermore, the views provided to spectators can also be provided in such a way that prevents fast movements of the content to the spectators, as would be typical if the same exact view generated by the HMD player were to be shown to the spectator. Because the spectator is not controlling the view in the virtual reality scene, if the spectator's view were tied directly to the HMD player, the content presented to the spectator would have periods of fast movement, such as when the HMD player moves his or her head up down to the right or in different directions. In one configuration, the spectator views can follow the movements of the HMD player, but with a smoother delay, so as to prevent this orientation of the spectator. In other embodiments, the spectator views can be fixed to different locations within the virtual reality environment. These fixed locations can be predefined spots that are selected by the content developer, as potentially being interesting to the spectator. In an alternate embodiment, the spots can move, e.g., to follow the HMD player.

In some embodiments, the predefined spots can be selected for specific spectators, based on the spectator's preferences. If the spectator has a preference of viewing certain types of content, certain spots within the virtual-reality content can be selected for that spectator. Different spectators can therefore have different content selected from different spots and points of view into the virtual reality scene, as navigated by the HMD player. Furthermore, because multiple spectators can view the HMD player content, e.g. via a website that provides twitch-type sharing, the different spectators can have different viewing spots within the virtual-reality content. In alternate embodiments, all spectators can view the same content from the same viewing spots.

Furthermore, if spectators use a website that provides twitch-type sharing, many HMD player content feeds can be provided and be made selectable by the various spectators. The feeds can be shared via the internet, from a computer of the HMD player to a website, which then can publish the content and/or make it available for selection for view by spectators. By way of example, if the HMD player decides to share the HMD experience, that experience can be selected by a spectator. The spectator can then be provided with functionality for selecting the types of views, or be provided with specific pre-authored spots for viewing the virtual-reality content generated by the navigation of the HMD player. In one embodiment, providing a decoupled viewing spots into the virtual-reality content to spectators, avoids having to provide a hard fixed view that is typically provided from the perspective of the actual HMD player.

In some embodiments, the view provided to spectator can also be from the perspective of the actual HMD player, but can be provided with a slightly decoupled connection, referred to as a rubber band link or coupling. The rubber band link provides for a viewing spot that is similar to a virtual camera positioned above the head of the HMD player. The virtual camera that provides that view can move and follow the view of the HMD player, with a slight delay behind the movements of the HMD player. By way of example, if the HMD player looks to the left quickly, the virtual camera can shift slowly to the left following the HMD players viewing direction. If the HMD player moves his head up and down quickly, the delay of the virtual camera can avoid any movement either up or down, since the direction of the HMD player returns to straight ahead.

In still further embodiments, the spectator can be provided with different viewing spots into the virtual-reality environment, which may also include looking at the HMD player or the character being controlled by the HMD player. In one embodiment, this configuration can define a type of automatic cameraman angle, which is viewing the HMD player's character as it traverses the virtual environment. The angle provided to the spectator is therefore more interesting and can shift or pop between different viewing spots, as the HMD player traverses to different locations within the environment, the game, the content, or scenes.

In one embodiment, the methods, systems, image capture objects, sensors and associated interface objects (e.g., gloves, controllers, hands, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2A:
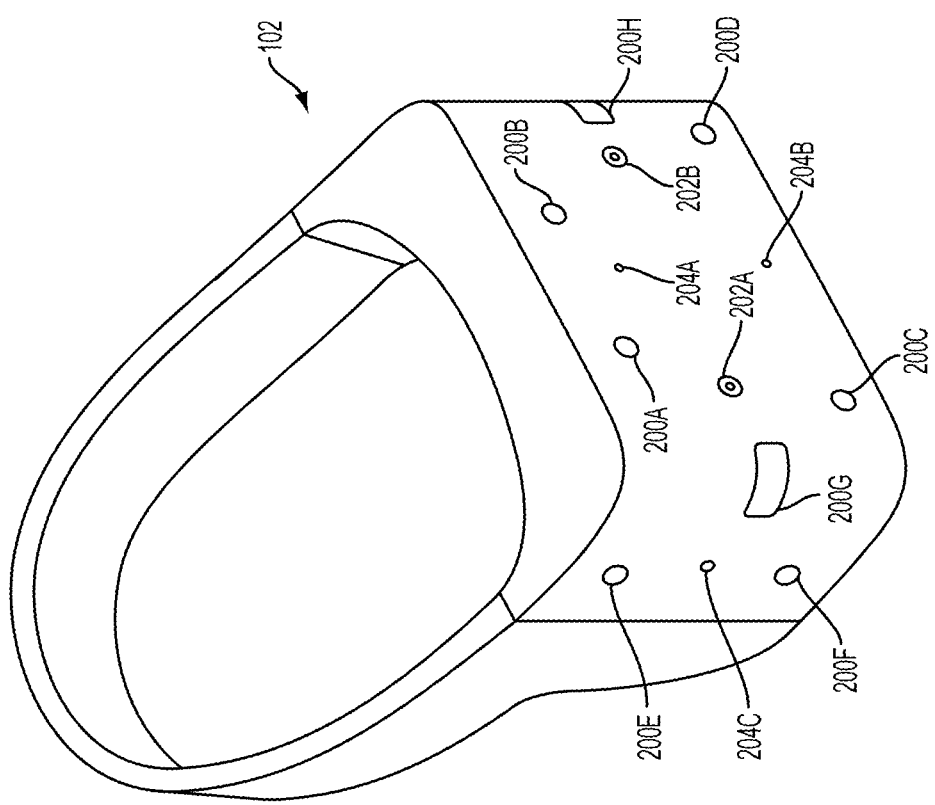
FIG. 2A illustrates a head-mounted display (HMD), in accordance with an embodiment of the disclosure.

FIG. 2A illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
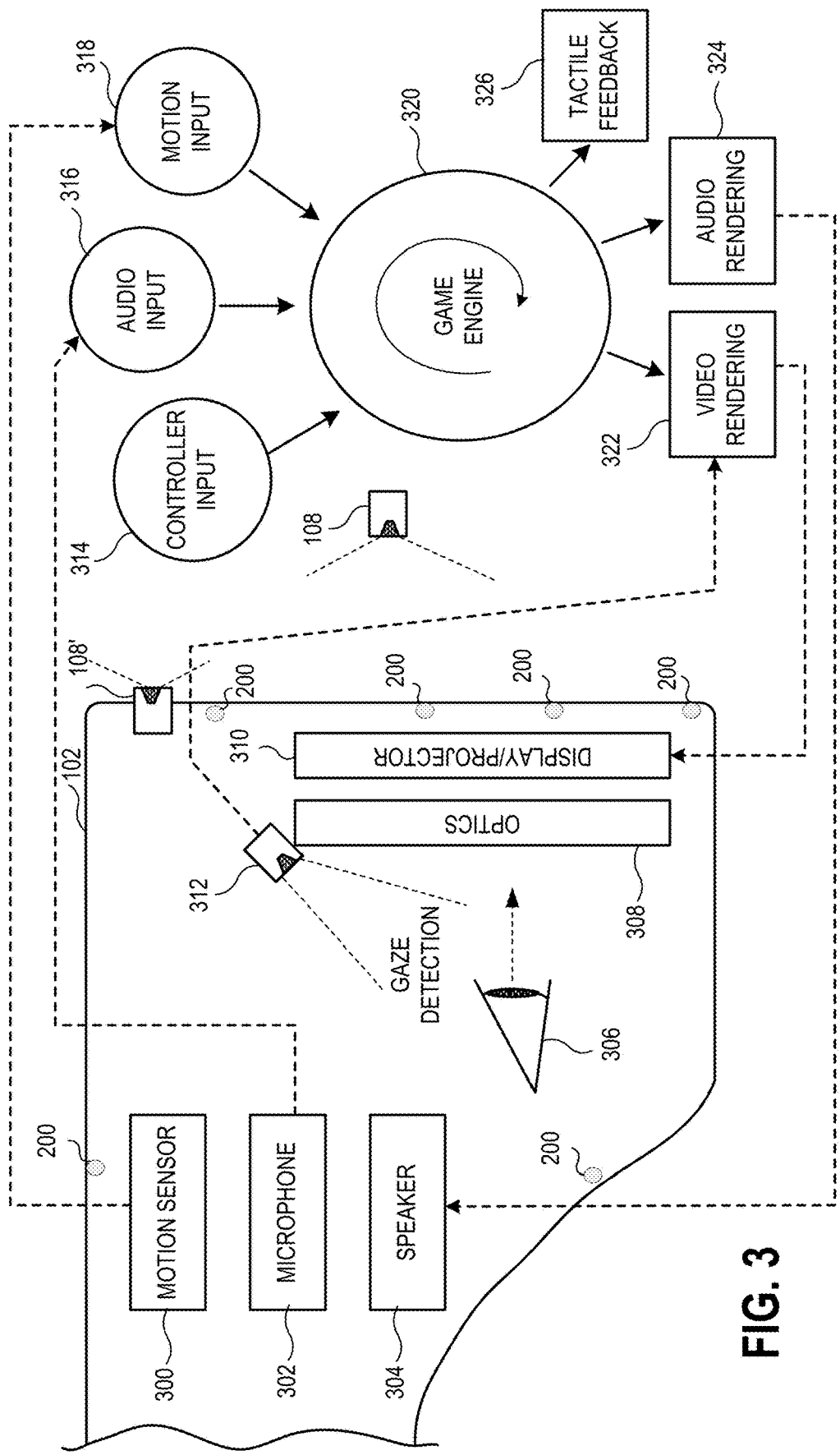
FIG. 3 conceptually illustrates the function of an HMD in conjunction with an executing video game, in accordance with an embodiment of the disclosure.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with"video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 2B:
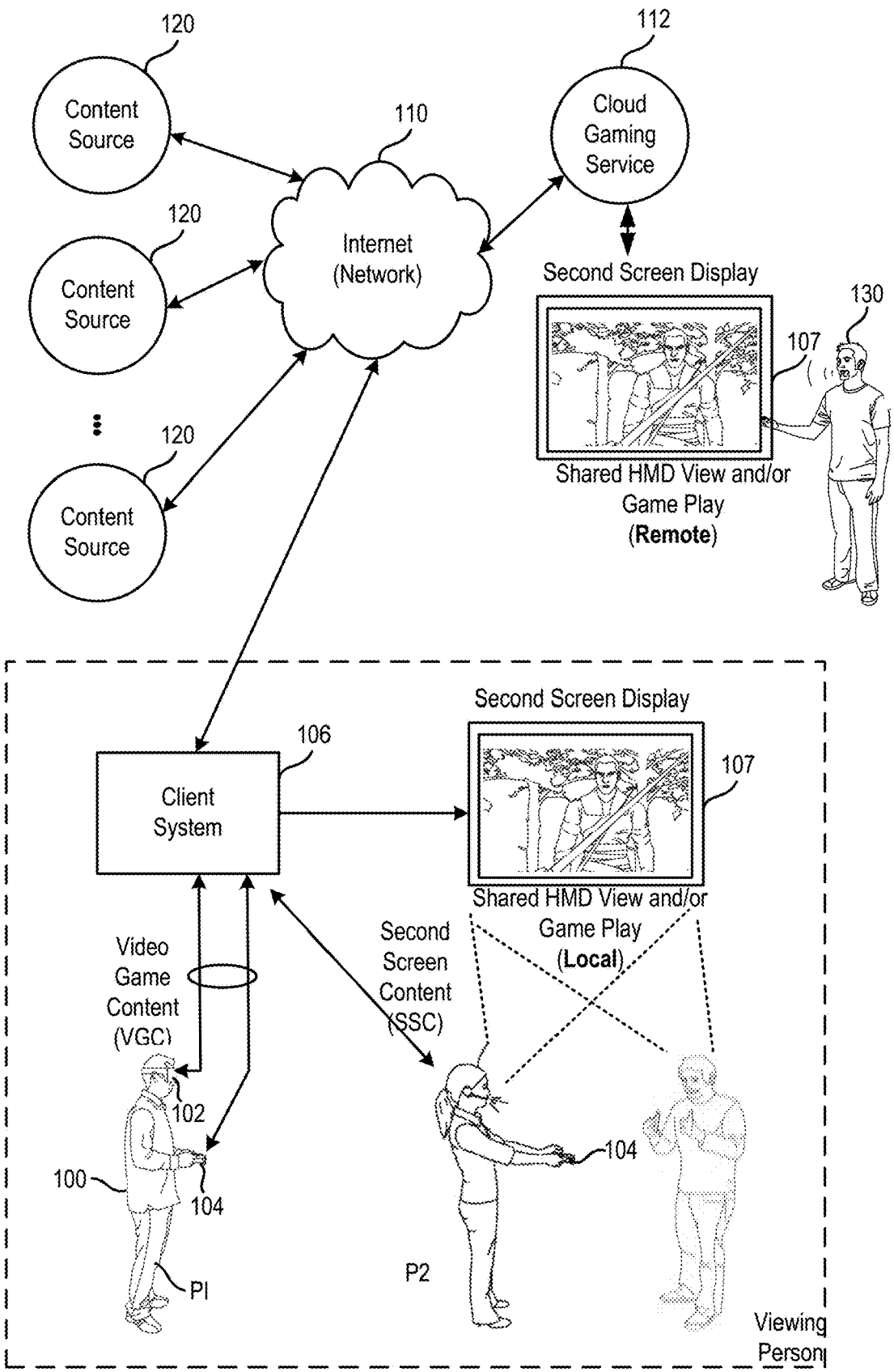
FIG. 2B illustrates one example of an HMD user interfacing with a client system, and the client system providing content to a second screen display, which is referred to as a second screen, in accordance with one embodiment.

FIG. 2B illustrates one example of an HMD 102 user interfacing with a client system 106, and the client system 106 providing content to a second screen display, which is referred to as a second screen 107. As will be described below, the client system 106 may include integrated electronics for processing the sharing of content from the HMD 102 to the second screen 107. Other embodiments may include a separate device, module, connector, that will interface between the client system and each of the HMD 102 and the second screen 107. In this general example, user 100 is wearing HMD 102 and is playing a video game using controller 104. The interactive play by user 100 will produce video game content (VGC), which is displayed interactively to the HMD 102.

In one embodiment, the content being displayed in the HMD 102 is shared to the second screen 107. In one example, a person viewing the second screen 107 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 107 along with the VGC received from the HMD 102.

Accordingly, the interactivity by other users who may be co-located or remote from an HMD user can be social, interactive, and more immersive to both the HMD user and users that may be viewing the content played by the HMD user on a second screen 107. As illustrated, the client system 106 can be connected to the Internet 110. The Internet can also provide access to the client system 106 to content from various content sources 120. The content sources 120 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 120, or from a local user, or a remote user.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore the replays using an HMD/VR headset. Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

As described above, there is a need to provide users the ability to spectate, e.g., watch the interactive activity being experienced by users wearing HMDs 102. For example, one HMD virtual reality player may be immersed in the activity presented in the HMD, while other persons may be co-located with the player. These other co-located players may find enjoyment in watching the interactivity experienced or virtual reality scene being viewed by the HMD player. As used herein, an HMD player is one that is viewing content presented on the HMD, or can be one that is interacting with some content resented on the HMD, or can be playing a game presented on the HMD. As such, reference to the player, is only made with reference to the user that is wearing the HMD, irrespective of the type of content being presented on the HMD.

In still other embodiments, other persons that are not co-located with the HMD player may wish to view the content, interactivity, or media being presented in the HMD of the HMD player. For instance, a website may be provided to present users with the ability to select from different HMD players, so as to watch and spectate while the HMD player performs his or her activities. This example is similar to standard Twitch-type experiences, which allow users connected to the Internet to access the website and search for different types of content or media being played by remote players. The remote players may, in some embodiments, be playing games using an HMD 102.

In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the HMD player. Thus, a website can be provided that enables users to view and select specific interactive content that may be actively played by a remote HMD player. The remote viewer wishing to view the activity by the HMD player, can simply click on that content and begin watching.

The person watching and viewing the actions by the HMD player is generally referred to as a spectator. Spectators are those persons who are given access to view the activities, interactivities, actions, movements, etc., but are not necessarily controlling the game action. For this reason, these viewers are referred to as spectators. In the context of an HMD player, the content being presented in the HMD display is dynamic and is controlled by the movements of the HMD player. For example, when the HMD player moves his or her head around, that player is presented with different content that is viewable, similar to the way real world viewing of a person's surroundings can occur.

Although the head movements of the HMD player are natural to the HMD player, a spectator that is provided the same view as the HMD player may become nauseous or dizzy when viewing the content due to the rapid movements. The reason for this is that the viewer is not him or herself moving their head in a similar way as does the HMD player, which causes the content to be changed based on the direction of viewing by the HMD player. In the various embodiments described herein, methods, systems, computer readable media, and cloud configurations are provided, which enable spectators to view content being viewed by the HMD player, in a way that does not distract the spectator nor does it have the tendency of causing the spectator to become dizzy or nauseous.

By way of example, some of the embodiments described herein teach ways of providing different viewing spots within the virtual reality environment being viewed by the HMD player. In some embodiments, the viewing spots are fixed in terms of the angle, direction, and content being viewable by the spectator. Thus, if the HMD player moves his or her head one way or the other, the spectator's view into the virtual reality environment may be maintained stable. In some embodiments, as the HMD player moves and traverses through different virtual reality environments scenes, locations, areas, levels, chapters, etc., the spectating user can be provided with different viewing spots, which are customized to the viewing spectator. For instance, various viewing spots can be pre-authored for different types of content.

If the content is a video game, viewing spots along different paths that can be taken in the videogame can be predefined as pre-authored spots for viewing by the spectator. Thus, when the HMD player moves along a particular path, the spectator can be provided with viewing spots along that path, which may be preselected or pre-authored by the game developer, earlier spectators, or the HMD player. In this manner, a spectator may be popped from one viewing spot to the next viewing spot, based on a determination that those viewing spots are superior or better or provide more interesting views as the HMD player moves about an HMD VR environment. In further embodiments, spectators may be provided with sub-portions of viewable content that is being viewed by the HMD player. In other embodiments, spectators may be provided with additional content that is not yet viewable by the HMD player.

Depending on the game, the environment, the type of content, the type of multimedia, or by defined rules or constraints, spectators may be provided with less or more of the viewable content being viewed by the HMD player. As mentioned above, the content that is made viewable to a spectator can be the same content being viewed by the HMD player, but from a reference point of view that is different than the HMD player. However, in some embodiments the view provided to the spectator can be similar to the HMD player's view, but at a slight different angle, or viewing perspective. Further, the spectator can be provided a similar view to that provided to the HMD player, from the context of a virtual camera writing over the head of the HMD virtual player. In one embodiment, instead of moving the virtual camera view provided for the spectator of the content being viewed by the HMD player, the spectator's view is not moved at the same rate or speed as the view is moved by the HMD player when the HMD player makes head movements.

In this embodiment, the virtual camera view provided to the spectator can be moved at a slower rate than does the view of the HMD player, which changes based on the actual speed of the user's head movements. Still further, the movement of the virtual camera view can be set to follow the movement of the HMD player's head, with a delay. The delay can be similar to a conceptual rubber band that links the virtual camera view to the movements of the HMD. That is, if the user's head moves to the left quickly, the spectator's virtual camera view will move to the left slower, with the delay similar to the way an object would trail when connected by a rubber band to a moving object ahead of it. In some configurations, a gearing ratio would be applied to the movement of the virtual camera view, such that the virtual camera moves at a rate that trails the movement of the actual view of the HMD player. The gearing ratio may be modified dynamically by the computer, the game, and/or program executing the views for the spectator into the virtual reality scenes. The gearing may be modified, for instance, faster in some games, some scenes, some situations, some levels, for some users, etc., or slower in other instances. By using dynamic gearing, the movement of the virtual camera view can be smoothed out, so as to provide a more pleasant viewing experience for the spectator view, even when the HMD moves fast or erratic.

In further embodiments described below, spectators can be provided with visual clues to enable the spectator to identify where the HMD player is looking within a virtual reality environment. One configuration can allow for tracking of the gaze of the HMD player, to determine what exactly the HMD player is looking at within the VR scene. For the spectator, who may be viewing the VR scene from the perspective of the virtual camera view (e.g. virtual camera floating behind the head of the HMD player), it would be useful to determine what is the focus in the particular scene. In this manner, the spectator can also focus upon what the virtual reality player feels is important in the scene.

In some examples, and a first-person shooter game, the spectator may want to know where the HMD player is looking, such as to identify enemies or obstacles. In one embodiment, by tracking the gaze of the HMD player, it is possible to identify what the HMD player is looking at, by highlighting content, changing the contrast of certain objects or locations, encircle content, add a marker, grey-out in area, add flashing beacons, add text, add floating objects, etc. In this manner, the spectator can then know for sure where the HMD player is looking, so the spectator himself can also view that same area and experience the content with more enjoyment.

For instance, the HMD player may be more experienced in a particular game, or has watched a particular type of content, and providing this indicator of where the HMD player is looking in the virtual reality scene will provide guidance, visual cues, and help to the spectator. In some embodiments, these identifying features can be turned on and off, so as to remove distraction. The identifiers can be activated by the HMD player or can be activated by the spectator. In some embodiments, where multiple spectators are viewing the same content provided by the HMD player, e.g. in a Twitch presentation, each of the spectators can be provided with different controls that provide to them the ability to provide the visual indicators or not. From the perspective of the HMD player, the indicators may not be shown at all in the HMD of the HMD player. However, these indicators will be useful to the spectator or spectators that may be viewing the content being interacted with by the HMD player.

In some embodiments, spectators can be provided with controls that allow the spectator to identify specific listening zones within the virtual reality environment. The listening zones allow spectators to select where in the virtual reality environment they wish to listen from. What this means is that the spectator is essentially provided with listening audio and acoustics that mimic a situation where the spectator would actually be present in the scene from that specific location. By way of example, if a spectator is viewing HMD content that includes a building across the street, relative to the viewing location, the spectator can identify some location in the building, e.g. the second-story where a person is standing, and select to listen at that location.

This functionality provides a listening teleportation for the spectator, which allows the spectator to listen to the content of audio, and acoustics as if the spectator were sitting or standing in the second-story building. The audio and acoustics, in one example, would essentially magnify the audio sounds that would be present at the second-story location of the building, and reduce the sounds that are further away from that virtual location. In some embodiments, the spectator can from time to time, select different locations within the environment for being the primary listening zone. In still other embodiments, the listening zone can also be adjusted to be the same listening zone of the HMD player. A spectator can be provided with switchable selection capabilities, so as to identify where in the virtual environment the spectator wishes to listen.

Again, it is noted that the spectator can be local to the HMD player, and can be viewing the HMD content on a second screen as described with reference to FIG. 2B. Alternatively, the local viewer, being a spectator, can also be wearing an HMD, which provides spectator viewing into the HMD player content. In still another embodiment, the spectator can be remote, and can be viewing from a webpage if the HMD player content is being published to a website that allows for viewing. In some embodiments, the remote viewers, which act as spectators, can be watching live or substantially live content by the HMD player. In other embodiments, the remote viewers, which act as spectators, can be watching a recorded version of the content that was viewed by the HMD player. Still further, websites can be provided that allow for multiple or even many multiples of spectators to watch the same content of the HMD player, whether live or recorded.

Figure 4:
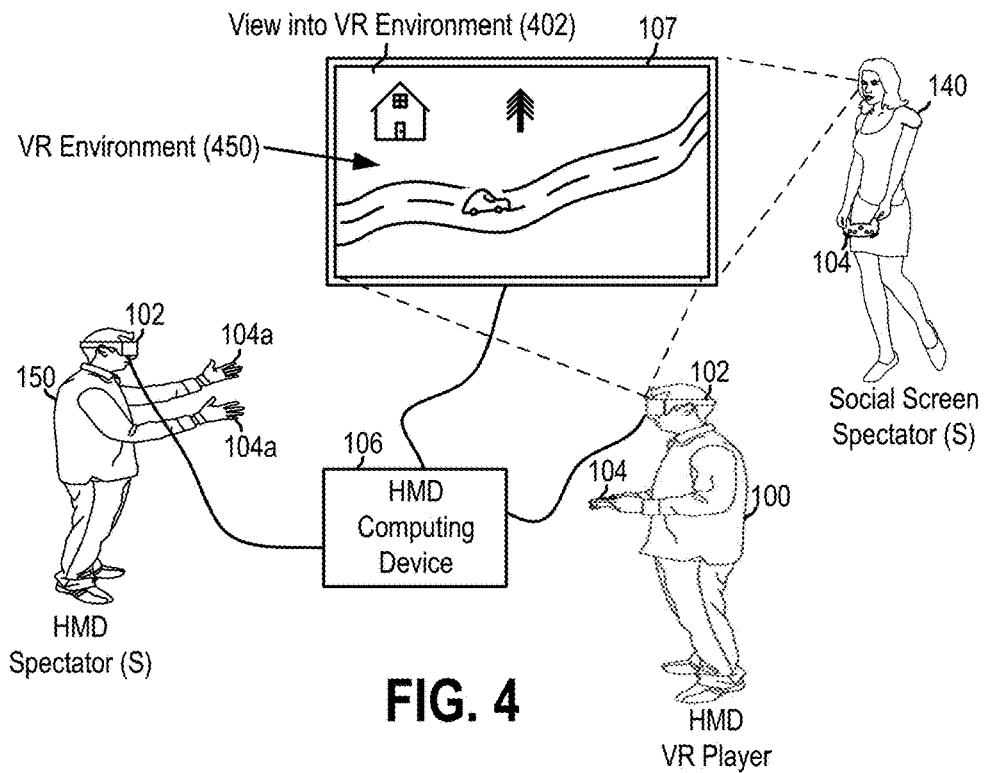
FIG. 4 illustrates an example of an HMD player navigating a virtual reality environment, and one or more spectators viewing the virtual-reality content.

FIG. 4 illustrates an example of an HMD VR player 100, who may be interacting with a virtual environment 450 via computing device 106, in accordance with one embodiment. The HMD VR player 100 is therefore driving the interactivity within the VR environment 450, which will move the scenes presented in the HMD 102, as well as the replicated view shown in the display 107. The spectator can therefore be one that is viewing the display 107, such as spectator 140. As mentioned above, the spectator 140 is a social screen spectator, as that spectator is able to interact with the HMD player 100 in a co-located space. In other embodiments, or in addition to the co-located spectator 140, an HMD spectator 150 can also be provided access to the content being navigated by the HMD player 100. The HMD spectator 150 can be co-located with the HMD player 100. In other embodiments, the HMD spectator 150 can be remotely located from the HMD player and can view the content from a website, such as a twitch-type viewing website. Therefore, the example shown in FIG. 4 is only one example, and it is possible to have multiple spectators or even thousands of spectators viewing the HMD players' content from remote locations. The spectators, whether they be viewing a display 107 or viewing the content via an HMD, will be provided with functionality for improving the spectating experience.

Figure 5:
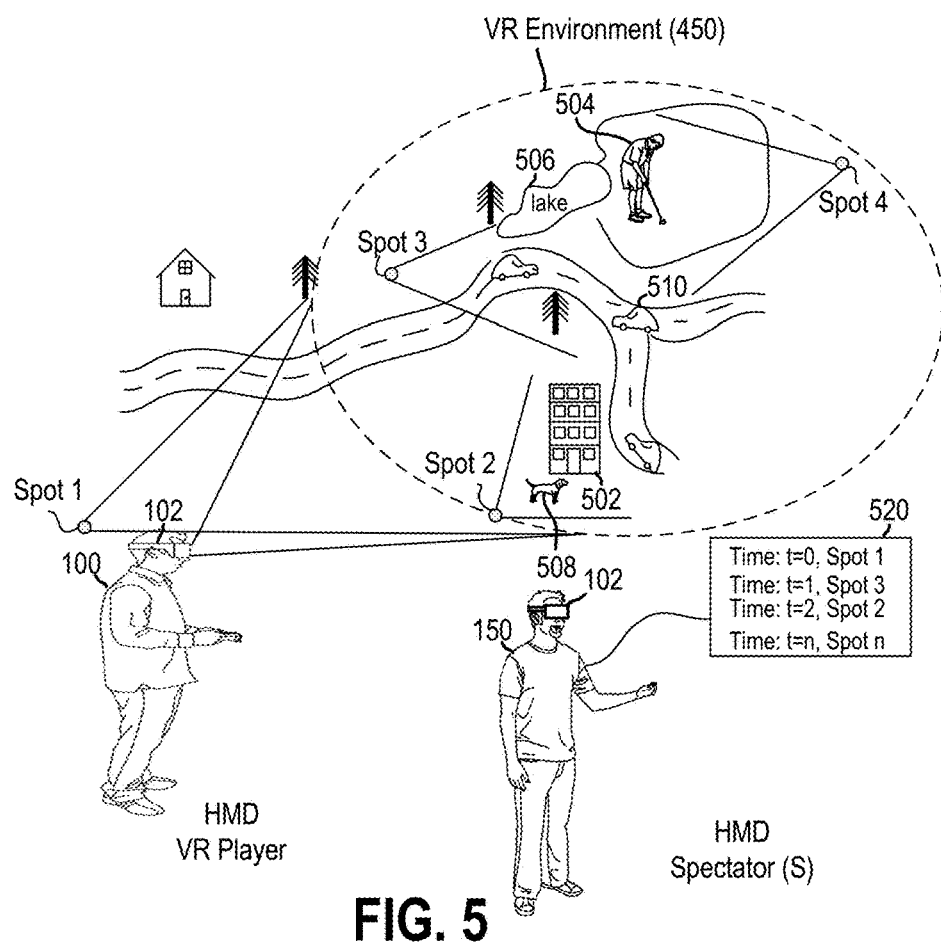
FIG. 5 illustrates an example of an HMD player navigating the virtual reality environment, and an HMD spectator being provided with different viewing spots within the virtual-reality environment, which can be selected or pre-authored based on interesting content within the virtual-reality scene.

FIG. 5 illustrates an example of the HMD player 100 that is moving about the virtual reality environment 450, and viewing different content as he moves throughout the scene. As shown, the HMD player 100 has moved forward in the scene, which has exposed new content, such as an extension of the road, a building 502, a golfer 504, a lake 506, a dog 508, and other multimedia content. These types of multimedia content presented in the VR environment 450 are simply examples, and the type of content will change depending on the type of content being viewed, interacted with, or displayed. In one example, the VR environment 450 can be associated with pre-authored viewing spots, such as spot 1, spot 2, spot 3, and spot 4. Each of those spots have a particular viewing direction and angle into the VR environment 450.

Spot 1 is provided with a virtual camera view, which may float behind the head of the HMD player 100, which provides a close replica of the view being produced by movements of the HMD 102 of the HMD player 100. The other spots may be decoupled from the viewing angle of the HMD player 100, and instead can be placed throughout the VR environment 450, based on pre-authoring by content creators, or other users that may know where interesting content may reside within the virtual environment. For instance, if the content creator is a game developer, the game developer will know where interesting spots may be within the different VR environment locations, so that spectators can be provided with better viewing of action, things, movements, interactivity, or scenes, as the HMD player traverses the virtual reality environment 450 during one or more game sessions or viewing sessions.

In this particular example, the spectator is an HMD spectator 150. The HMD spectator 150 can be provided with specific viewing spots at different times within the activity shown of the virtual reality environment 450. For instance, as the HMD player 100 traverses or moves about the virtual reality environment 450, different content is shown, and based on the content that is being shown, different spots are selected for viewing consumption by the spectator or spectators. By way of example, the HMD spectator 150 is provided with a sequence of spots, such as spot 1 at time t=0, spot 3 at time t=1, spot 2 at time t=2, and so on.

Therefore, depending on where the HMD player 100 traverses, different spots may be selected dynamically for the spectator, so as to provide the most interesting views of content. By way of example, if the HMD player has reached the location of the golf course, the golfer 504 will be the focus of the viewing spot 4. If the HMD player has reached the location of the building 502, the viewing spot 2 will be provided to the spectator to allow viewing of the building 502 and the dog 508, which may be predetermined to be an interesting location or vantage point or viewpoint within the virtual reality environment 450.

Figure 6:
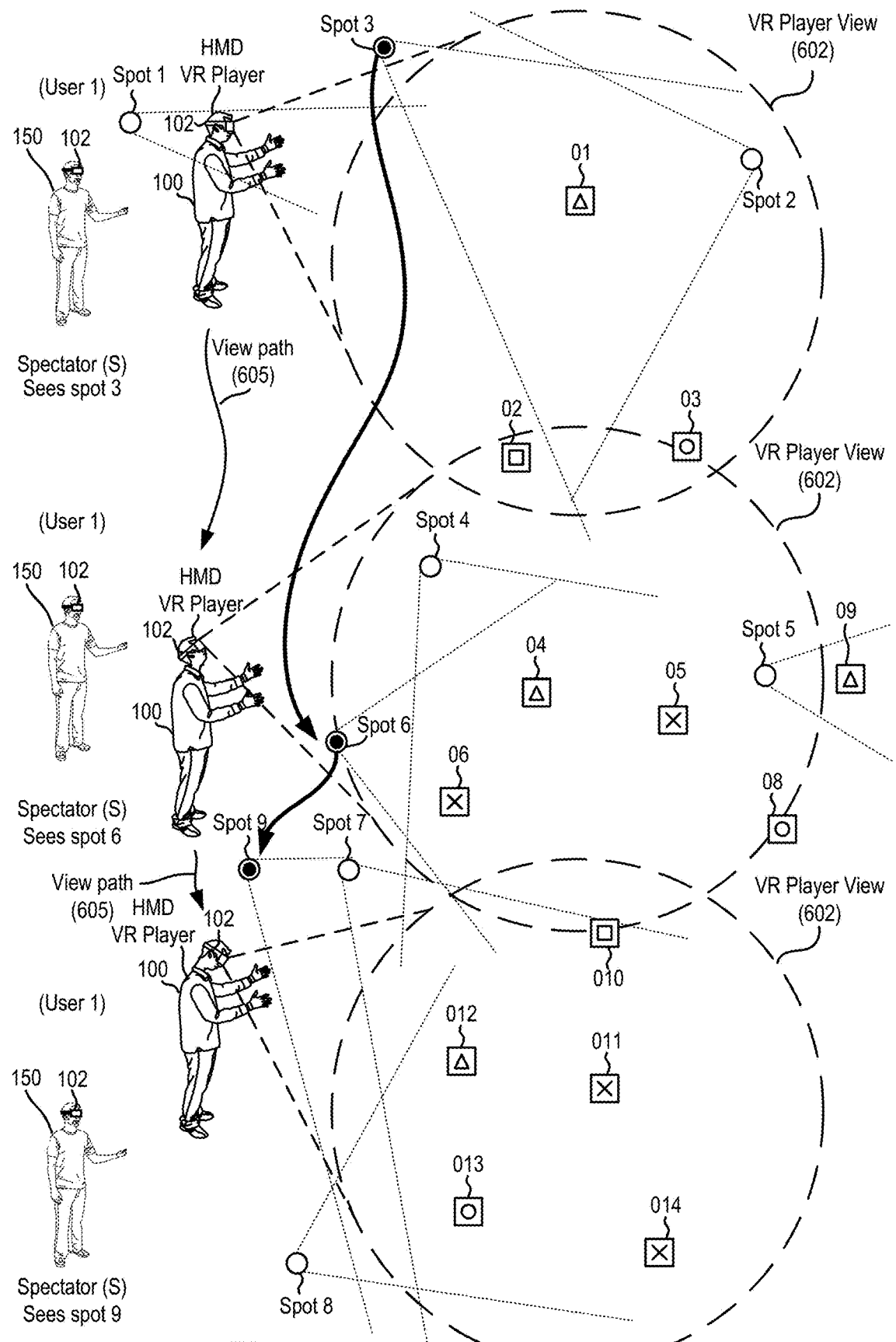
FIG. 6 illustrates an example of an HMD player navigating through the virtual reality environment and the automatic selection of viewing spots for a spectator, where the viewing spots are automatically selected based on the preferences of the spectating user, in accordance with one embodiment.

FIG. 6 illustrates an example of the HMD player 100 moving about a view path 605, which provides different views into the virtual reality environment 450. Thus, as the HMD VR player 100 moves about the virtual reality environment 450, different content can be shown in the HMD 102, when viewed by the HMD player 100. For simplicity, a plurality of objects O1-O14 are shown located throughout the virtual reality environment 450, and depending on the virtual reality player view 602, different ones of the objects will be visible to the HMD player 100. By way of example, the objects (O), are represented by icons X, O, Δ, □, but these icons can represent any type of content that can be presented on a display screen, such as characters, textures, terrain, interactive content, weapons, vehicles, buildings, graphics, text, and generally any type of multimedia viewable content.

In this example, it is shown that certain ones of the objects are viewable by the spectator 150, depending on the viewing spot that is provided for the spectator. In one embodiment, the viewing spots are pre-authored, so as to define where in the virtual reality environment 450 the spectator will be allowed to view, depending on where the VR player view 602 is focused. In some embodiments, these pre-authored spots are those that are believed to be interesting, novel, or provide better perspective into the virtual reality environment 450. In one embodiment, the viewing spots can be preselected, as pre-authored spots. As mentioned above, the pre-authored spots are those that are believed to provide interesting viewing angles or perspectives.

In this example, the selected spots for user 1, which is the spectator 150, will be spot 3, spot 6, and then spot 9. Spot 3 provides a somewhat overhead view that captures certain ones of the objects in the VR player view 602. Spot 6 provides a direct viewing angle in front of the HMD player 100, that highlights or provides a perspective view of certain ones of the objects. Spot 9 is similar to an overhead virtual camera, that sits slightly behind or above the HMD player 100, which provides a substantially similar view into the virtual reality environment 450, and the virtual player view 602. Therefore, as the HMD player 100 moves around, different ones of the viewing spots can be selected dynamically for the spectator 150. As mentioned above, the spectator 150 can be co-located with the HMD player 100, or can be a remote spectator that's viewing the HMD player 100 virtual environment from a website, an HMD connected to the Internet, a remote device, a television, or portable device.

Furthermore, different users, which are spectators, can be provided with different spots into the VR player view 602. The different users can be provided with different views, based on preferences of the specific users, which may be saved to user profiles. For instance, some users may have a preference identified in their profile that dictate that they like to see certain types of objects or like to see certain types of view perspectives. As a result, the spots can be customized for the users, and can also be customized for the users based on pre-authored locations. In some embodiments, the locations need not be pre-authored, but can be dynamically selected based on the content presented in the virtual reality environment 450. Broadly speaking, the viewing angles within the virtual reality environment 454 spectators can be set dynamically, based on a number of criteria.

The criteria can be based on pre-authored viewing spots, can be based on preferences of the spectators, can be based on dynamically placed viewing spots based on changing content within the virtual reality environment 450, or can be moved and adjusted by the spectator. If the spectator is provided with options for moving the view location into the virtual environment 450, those views provided to spectators can be different depending on the spectator that is watching the content being navigated or watched by the HMD player 100.

FIG. 7 illustrates a table defining various spectators 702 that may be viewing different types of content 704 of HMD players, in accordance with one embodiment. As shown, for user 1, who is the spectator in FIG. 6, the multimedia virtual-reality content is game 1. Game 1 is the content that the HMD player is navigating, and based on the navigation within the content by the HMD player, the spectator that is user 1, will be provided with pre-authored viewing spots 706. As shown in FIG. 6, the spots provided for user 1 are spots 3→6→9→N. In each of the viewing spots, interesting objects (O) 708 are viewable from those specific viewing spots. The viewing spots therefore provide viewing angles to view objects O1-O14, depending on the viewing perspective. A different spectator, such as user 2, may also be viewing the game 1 activity. However, that user may have a different preference for types of content that is interesting to that user. For this reason, the system can select different pre-authored viewing spots 1→4→9→N, than those provided to user 1. Similarly, the interesting objects that are provided for those spots will change, as viewed by the spectator user 2. This example is provided to emphasize that any number of users may be spectators, and those users can spectate into the same virtual-reality content navigated by the HMD user, and can individually be provided with different and unique viewing spots or angles into the virtual-reality content.

Continuing with this example, user 3 and user 4 may be viewing different environments, other than game 1. As noted above, the content does not have to be games, but can be any type of multimedia content, or content that can be displayed on a screen. The content can include, without limitation, graphical objects, text, associated audio, multimedia, interactive content, movie content, audio content, controllable character content, avatars, maneuverable objects, selectable objects, communication objects, interfacing objects, remote touring locations, demonstration videos, tourism content, amusement park content, or combinations thereof. Thus, depending on the environment, different pre-authored viewing spots X→N, and Y→N, can be provided that provide unique viewing of certain interesting objects or content within the virtual-reality environment 450.

Figures 8A, 8B:
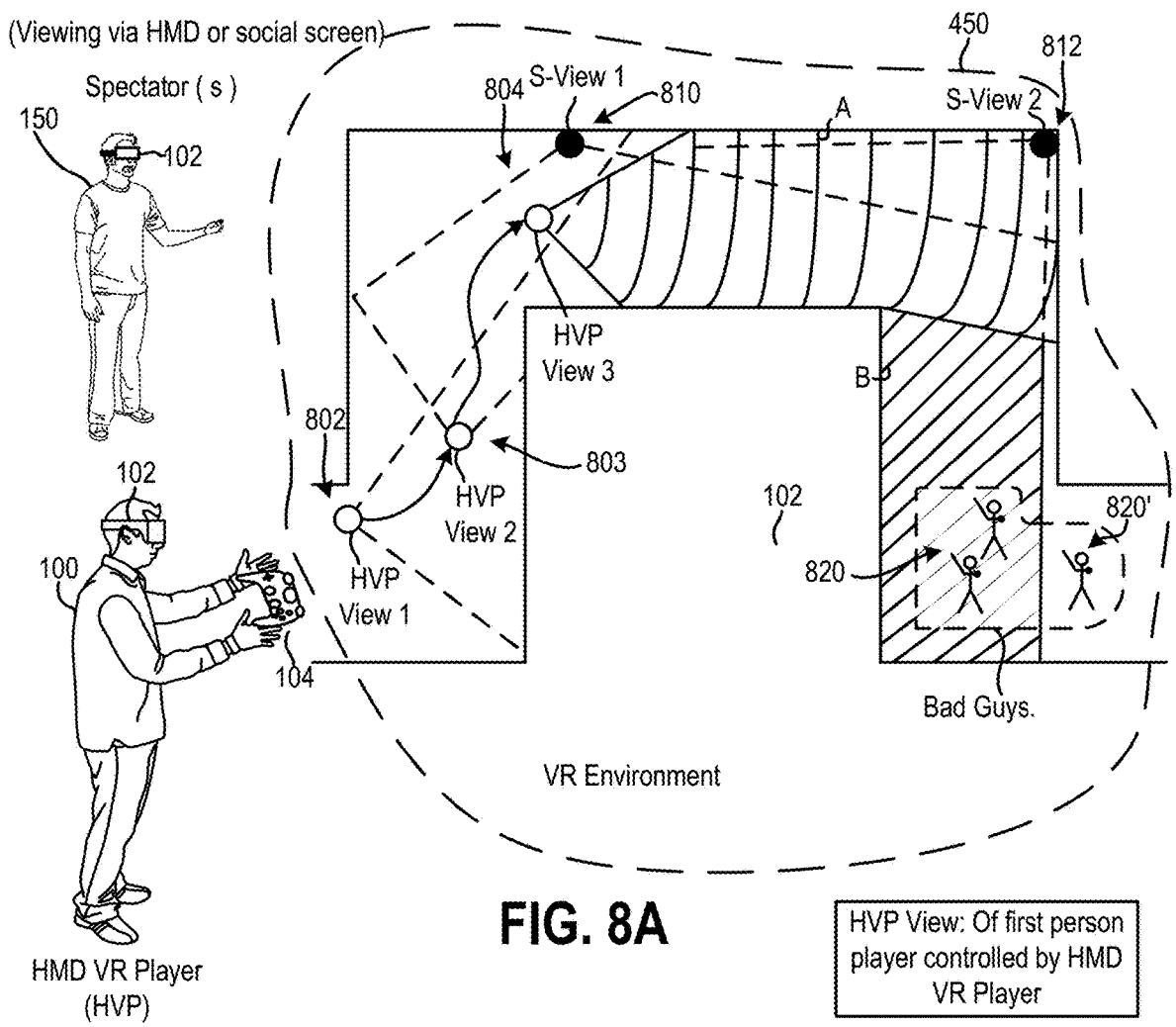
FIGS. 8A-8B illustrates an example of a virtual reality environment that includes a gaming area, where an HMD player can navigate and be provided with specific player reviews, and spectators that can be provided with views of the environment which include the views of the HMD player and optionally additional views that are not viewable by the HMD player, in accordance with one embodiment.

FIG. 8A illustrates an example of an HMD player 100, interacting with a video game scene depicted in the virtual reality environment 450, in accordance with one embodiment. The videogame provides, by way of example, a path along a corridor of walls that requires the user (first-person) controlled by the HMD player 100 to traverse. In this example, the HMD player 100 may be searching for bad guys 820, which may be hiding in some location along the corridor of the game. The HMD player, referred to herein as the HMD VR player (HVP), is shown moving between location 802, 803, and 804. A spectator 150 is provided with a view into the corridor depicted in the virtual-reality environment 450. The views provided to the spectator 150 may be customized based on the location of the first-person player controlled by the HMD player 100.

Different views into the corridor are provided to the HMD player 100 in locations 802 and locations 803. Once the HMD player reaches location 804, that view into the corridor may be limited due to the walls, thus providing a view that encompasses area A. The spectator 150, in one embodiment, is provided with various views into the virtual environment 450, based on one or more pre-authored spots. In this example, the spectator 150 is provided with spectator view S-view 1 at location 810 and spectator view S-view 2 at location 812. At location 810, the spectator view shows the character controlled by the HMD player 100 walking down the corridor toward the corner, and then the spectator view can shift to location 812, which will provide a more interesting view of the character controlled by the HMD player 100. At this point, at location 812, the spectator view may be limited to a subset of the view that is provided to the HMD player 100, namely area A.

However, location 812 also provides possible viewing of the bad guys 820 that are currently outside of the point of view of the HMD player 100. In one embodiment, the spectator view S view-2 is provided with additional area B for viewing, which is not yet viewable by the HMD player 100. This may provide the option for the spectator to see that the bad guys 820 are hiding around the corner, and may provide for an interesting action scene when the HMD player (first-person character) reaches that location. This may provide an extra level of excitement to the spectator, whereas the spectator knows that an interesting event will occur even before the HMD player knows that the event may occur.

In one embodiment, the extra content provided to the spectator is not made knowable to the HMD player 100, to avoid providing unfair notice to the HMD player. This prohibition of transferring the knowledge or information may be required depending on the game, which requires a level of skill by the HMD player. In other embodiments, it is possible for the HMD player to be provided with knowledge of certain content by spectators. Depending on the game criticality of data sharing or ambition of data sharing, spectators may be either prohibited from sharing information with the HMD player or can provide information to the HMD player. By way of example, if the spectator 150 is viewing from a remote website, e.g., a twitch site, that spectator can provide or feedback information to the HMD player in a number of ways. The information can be by way of text communication, chat communication, voice communication, audio communication, or combinations thereof.

FIG. 8B illustrates a table that shows different HMD player views 830, and the views that may be provided to spectators, in accordance with one embodiment. In some embodiments, the spectator views can be preset based on pre-authored spots, as described above. In other embodiments, the spectator views can shift simply to keep up with the location of the HMD player. When keeping up with the HMD player, the view may be selected proximate to the HMD player, looking at the HMD player, or in the form of a virtual floating virtual camera located above the head location of the HMD player. As shown in figure AB, the spectator view position 832 can change based on the HMD virtual reality player view (HVP) that is created based on the activity and control of the HMD player 100.

For instance, when the HVP is at view-3, the spectator view is automatically moved to spectator view S-view 2. This table also shows, for purposes of completeness, what the HMD VR player sees, from the various HVP views. When the HMD player is provided with HVP view-2, the area that is viewable is identified by A, as described with reference to FIG. 8A. In one embodiment, the spectator will see views 836, which follow the same views provided to the HMD player 100. That is, no additional content is provided to the spectator, other than the scene content that is viewable by the HMD player.

However, even if the same content is provided to the spectator, the spectator can have a different viewpoint into that same content. In another embodiment, the spectator can see more than the HMD player, in option 838. In this option, in view HVP view-3, the HMD player will see area A, whereas the spectator can be provided with additional viewing area B, in addition to area A. This additional area for viewing is provided to the spectator, since the spectator is located from a point of view that would provide a logically unobstructed view of certain content from that point of view, which is not the same as the point of view provided to the HMD player 100. As mentioned above, when additional content is viewable by the spectator, the spectator can either be allowed to share that information with the HMD player or prevented from sharing that information with the HMD player.

Figure 9:
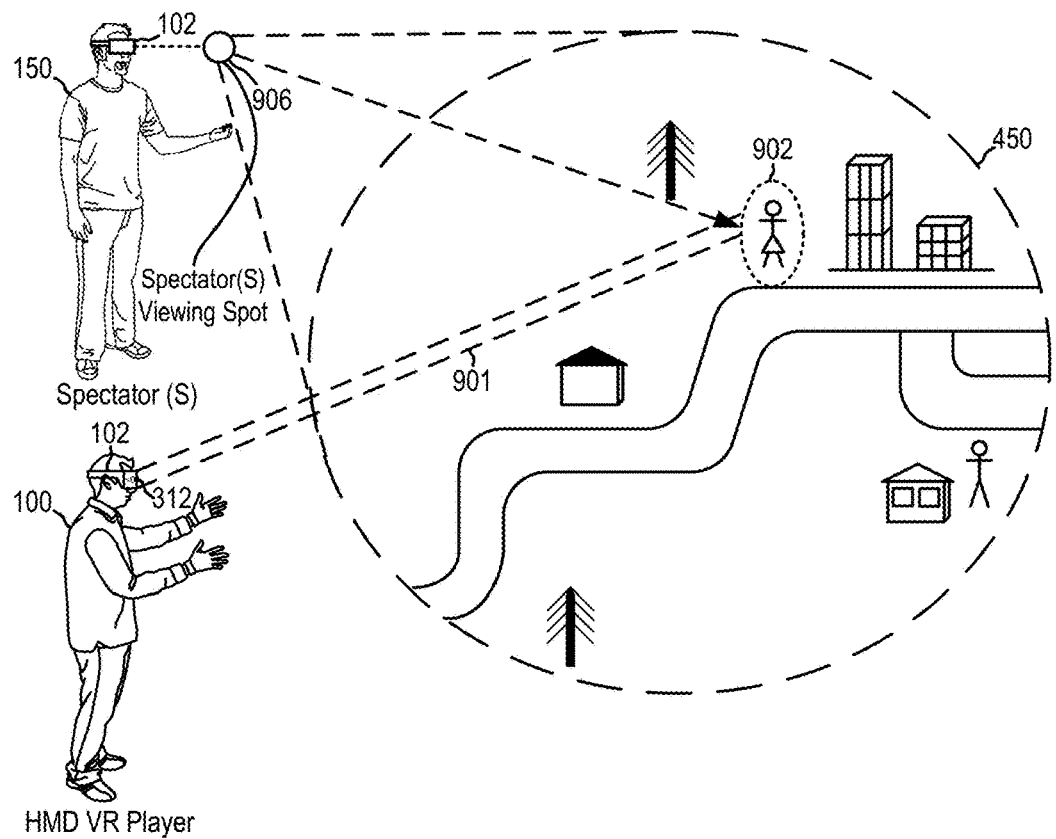
FIG. 9 illustrates an example where an HMD player can be viewing a specific content or item within a virtual reality environment, and the viewing direction or object being viewed by the HMD player can be identified for a spectator, in accordance with one embodiment.

FIG. 9 illustrates an embodiment where in HMD player 100 is viewing into a virtual reality environment 450, and the gaze direction 901 of the HMD player is identified. As mentioned above, one embodiment provides the ability to identify where the HMD player 100 is looking within the virtual reality environment 450. This information can be useful to a spectator 150, whom may desire to know what interesting content the HMD player 100 is looking at. In the context of a movie, the HMD player may be looking at an interesting scene. In the context of a demonstration, the HMD player may be looking at a specific feature of the demonstration object or lecture.

In the context of a game, the HMD player may be looking at specific character, object, area, etc. In one embodiment, the gaze direction 901 is detected by the HMD camera 312, which allows for detection that the HMD player 100 is looking at object 902. In this example, object 902 is represented as a girl standing next to a building. Although there are various other objects in the virtual reality environment 450, the HMD player 100 is focused on object 902. The spectator 150 would like to know where in the virtual reality environment 450 the HMD player 100 is looking. To do this, once it is determined where the HMD player 100 is focused viewing, that area of the virtual reality scene can be highlighted or identified so that the spectator 150 can visually know where the HMD player is looking.

As mentioned above, identifying that object 902 is the focus of the gaze direction 901 of the HMD player 100 can be conveyed by modifying the representation or area around or proximate or at the object 902. Object 902 may be highlighted, may be changed in color, may be grayed out, may be identified by a pointer, may be identified with text, may be allowed to flash in different colors, may provide one or more flash changes in image, may provide a sound, may provide a special movement, or combinations thereof. These identified ways of highlighting object 902, in one embodiment, are illustrated when viewed from the viewpoint of the spectator 150. In this example, the spectator 150 is viewing from a spot 906, which is similar to a floating virtual camera over the head of the HMD player 100. However, the spot for viewing into the virtual reality environment 450 may be located in other places, as noted above.

However, the identification that the HMD player 100 is viewing object 902, is represented to the view provided to the spectator 150. Thus, in one embodiment, the highlighting of the object 902 will not be visible to the HMD player 100, but simply visible to the spectator 150. In other embodiments, the spectator can determine by way of a selection object whether to activate or deactivate the ability to identify where the HMD player 100 is looking. Furthermore, multiple spectators can be viewing the same content being navigated by the HMD player 100, and different ones of those spectators can activate or deactivate this feature to allow knowledge of what the HMD player is looking at within the virtual environment.

In some embodiments, activating this feature can be automatic, and can be triggered based on the type of content being viewed by the HMD player. This way, the spectator can simply watch the content being navigated by the HMD player 100, and when certain objects should be highlighted to the spectator, the game developer can predefine certain times for identifying the gaze direction of the HMD player to highlight certain objects to the spectators. In further embodiments, some spectators may require more highlighting, e.g., such as for novice spectators. More experienced spectators may require less highlighting or assistance during the viewing of the HMD player activity. Accordingly, activating and the activating the gaze direction identification of gaze direction/viewable object identification can be toggled depending on developer settings, the spectators, the HMD player, complexity of the content, or combinations thereof.

Figure 10:
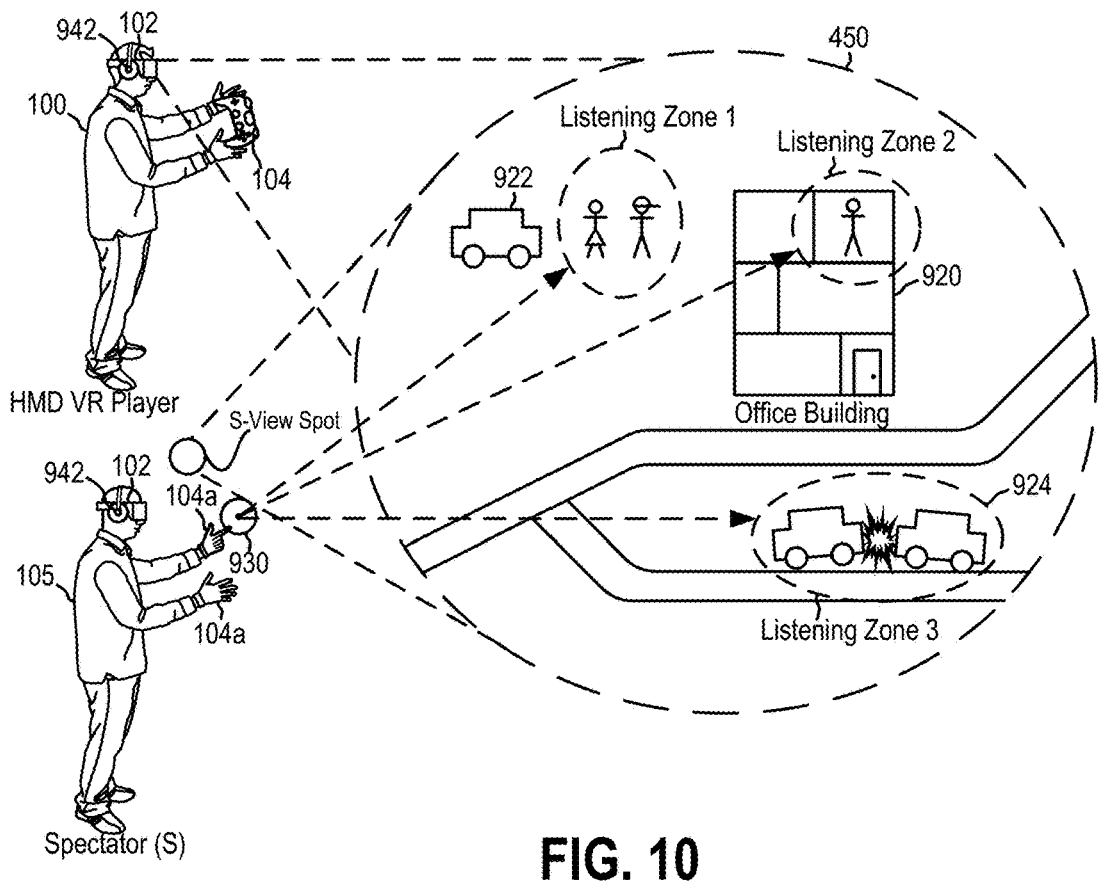
FIG. 10 illustrates an example where the virtual-reality environment being viewed by the HMD player can include various types of content, which themselves can include different types of audio that is associated to the specific locations within the virtual-reality environment, and allowing a spectator to decide which audio listening location to capture, while spectating, in accordance with one embodiment.

FIG. 10 illustrates an example where an HMD player 100 may be interacting with a virtual reality environment 450, and different types of activity are occurring therein. In this example, the virtual reality environment 450 includes a truck 922, a building 920, a car crash 924, and various other types of content. In one configuration, different activity will also produce different sounds that are being generated and listened to by the HMD player 100 by way of headphones 940. If the perspective of the HMD player 100 is from a first-person point of view, the sounds being generated within the virtual reality environment 450 will be relative to the position of the HMD player 100.

In this example, the car crash 924 may sound further away and possibly the HMD player 100 may not be able to listen to conversations had in the various listening zones 1, 2, and 3. If the HMD player 100 were to approach those listening zones, the sounds for those listening zones would then change, along with any associated acoustics to provide a realistic listening environment, as if the player were actually in the virtual reality scene. From the point of view of the spectator 150, the spectator 150 may be provided different points of view into the virtual reality environment 450, as described above. In some configurations, the spectator 150 may desire to listen in at different listening zones.

The spectator may be provided with functionality to select different listening zones, which would impact the audio provided to the spectator 150, and listened to via headphones 942. By way of example, if the spectator 150 desires to listen in to listening zone 1, the spectator 150 may be able to hear a conversation had by virtual reality players or artificial intelligence (AI) characters in listening zone 1. The spectator 150 can therefore be placed in that listening zone, and sounds coming from other listening zones will be generated to the spectator 150 as if the spectator 150 were in the listening zone 1. The same is true if the spectator 150 decides to select the listen to listening zone 2, which may be a conversation being had by a person standing inside of a three story office building 920.

And also, the spectator 150 can similarly listen to listening zone 3, to hear what's going on with respect to the car crash 924. In this example, the spectator 150 is also using an HMD 102. The spectator 150 may be using glove gestures 930 for selecting the listening zones. In other embodiments, the spectator can be using a controller, a keyboard, hand gestures without gloves, voice input, gaze input, etc., to direct which listening zone is interesting to the spectator 150. Still further, the spectator can simply be viewing the content from a display screen connected to a website, such as a twitch-type site. In some embodiments, a personal computer (PC), game console, smart phone, tablet computer, etc., may be used to view the virtual reality environment 450, which is being played by the HMD player 100.

In some embodiments, the content viewed by the HMD player via the HMD 102 can be modified so that it can be displayed on a two-dimensional screen. For example, a 3-D to 2-D conversion can be performed on the content before it's shared to the twitch-type service. In other embodiments, the full 3-D content can be shared to the twitch-type service, and the spectator connected to the twitch-type service can be viewing the content via an HMD. It should be understood that the way in which spectators can consume the virtual reality environment 450 can vary, and the functionality provided to spectators can also vary. Broadly speaking, spectators can be provided with highlighting to see where HMD player's 100 are looking, such as in FIG. 9, and can also be provided with dynamic selectable settings to allow listening a specific locations within a virtual reality scene.

Furthermore, the spectators can be provided with different viewing spots into the virtual reality environment 450. These viewing spots can be dynamically controlled or pre-authored, to provide specific viewing locations and angles to the spectators. These functionalities provide for dynamic and enhanced spectating abilities, that will enhance the experience a spectators viewing HMD navigated content. As mentioned above, these embodiments also facilitate spectators to view the content in a more normal way that is not tied to the rapid movements of an HMD player's head, which can cause disorientation or simply discomfort in watching the HMD content.

Providing spectator viewing spots, which may move gradually or slowly depending on the location of the HMD player, provides for an easy way of looking into the virtual reality content being enjoyed by the HMD player. Spectators can therefore watch the content with ease, and are provided with ways of improving the watching enjoyment, or participation in the game play or multimedia content viewing via the HMD devices. By providing these enriched functionalities, spectators are no longer tied to the fixed viewing angles of the HMD player, and are no longer forced to view the same exact views nor to exactly follow the motions being driven by an HMD player.

Figure 11:
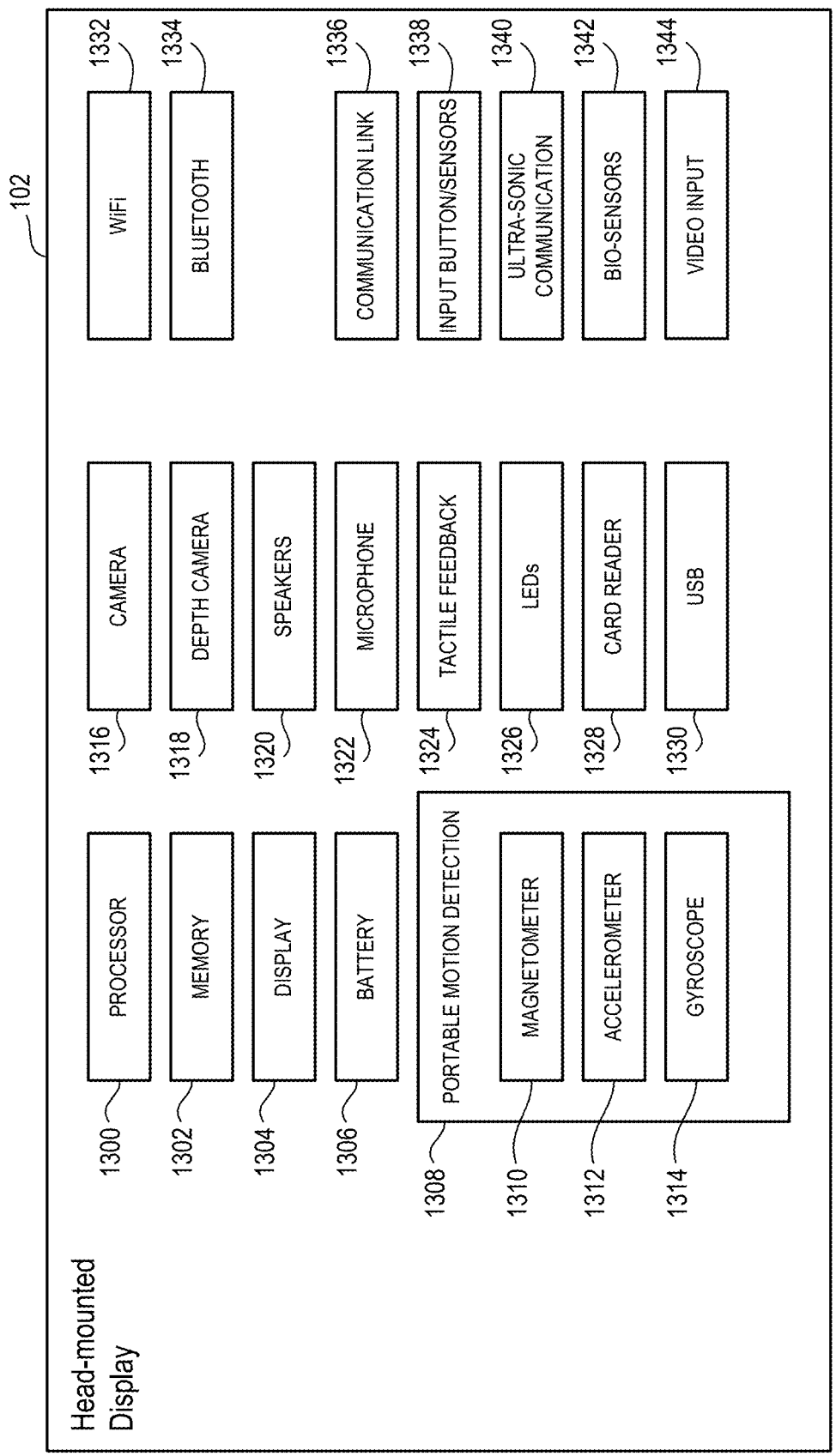
FIG. 11 illustrates components of a head-mounted display, in accordance with an embodiment of the disclosure.

With reference to FIG. 11, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 12:
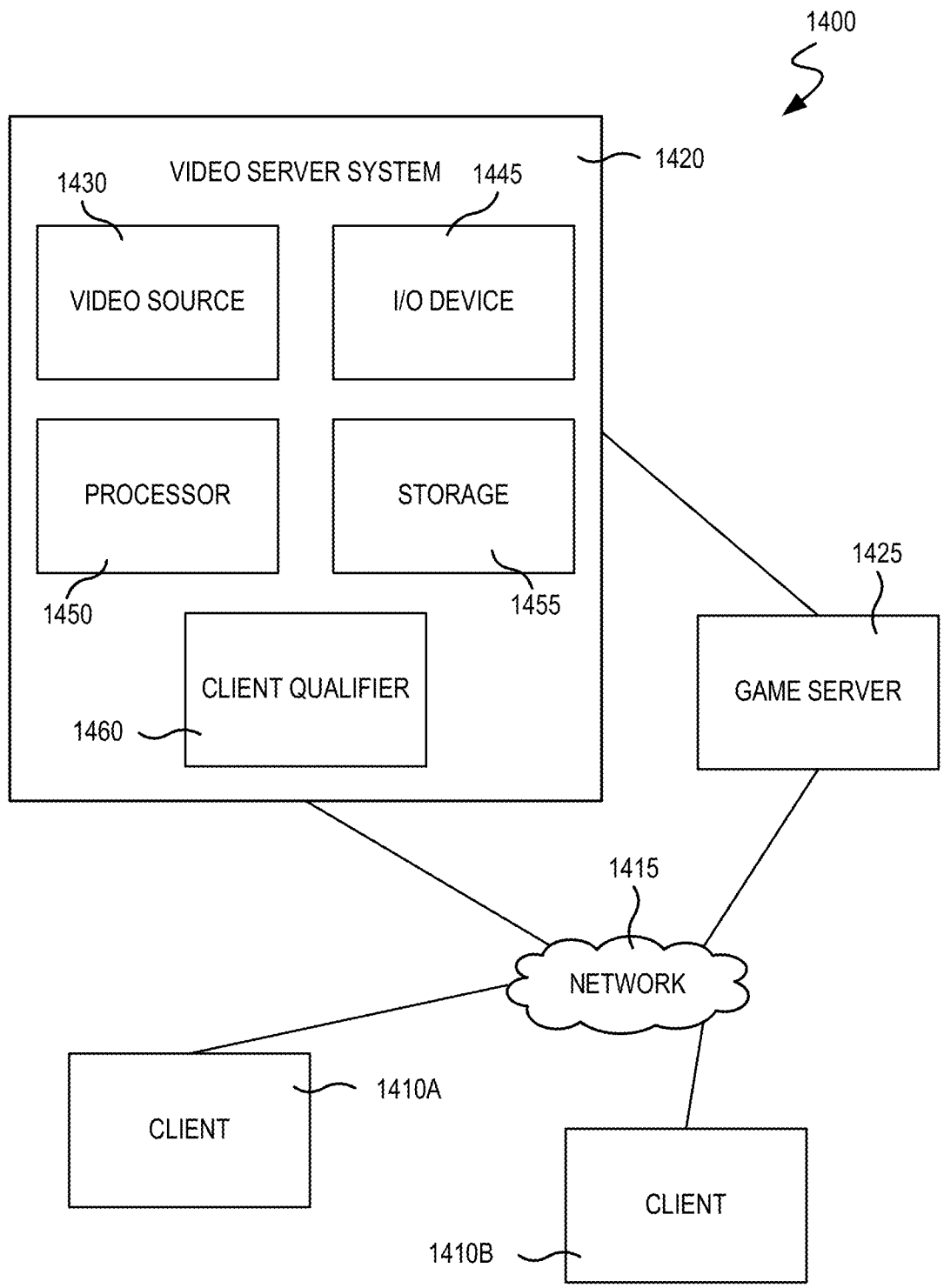
FIG. 12 is a block diagram of a Game System 1400, according to various embodiments of the disclosure.

FIG. 12 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A., 1410B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream, optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method for generating views of a virtual reality environment for a spectator, comprising,
    generating a virtual reality environment to be rendered for a head mounted display (HMD) of an HMD player, the HMD player being provided with an HMD view that is controlled by movement of the HMD by the HMD player;
    providing a spectator view into the virtual reality environment, the spectator view being associated with a viewing spot directed into the virtual reality environment, the viewing spot is decoupled from the HMD view, wherein the viewing spot is one of a plurality of viewing spots selected for the virtual reality environment; and
    automatically moving said viewing spot of the spectator view to predetermined viewing spots that follow the HMD view in the virtual reality environment as the HMD view changes responsive to movement of the HMD by the HMD player,
    wherein the changes in the HMD view occur during a session as time progresses for said session, and wherein the viewing spot of the spectator view has a delay in being moved to follow the HMD view, and said delay in moving the viewing spot does not delay time progress for said spectator view relative to time progress for said HMD view during said session.

2. The method of claim 1, wherein the delay in the viewing spot being moved functions to follow the HMD view at a slower rate than movements of the HMD, such that the HMD view advances in the virtual reality environment ahead of the spectator view.

3. The method of claim 1, wherein select ones of the viewing spots are selected for the spectator based on specific content identified in the virtual reality environment.

4. The method of claim 1, wherein the spectator view is part of the HMD view.

5. The method of claim 1, wherein the spectator view is greater than the HMD view.

6. The method of claim 1, wherein a gaze direction of the HMD player is used to identify content being viewed by the HMD player to the spectator.

7. The method of claim 1, further comprising,
    receiving selection of a listening zone in the virtual reality environment by the spectator, wherein selection of the listening zone provides audio to the spectator from a perspective of the listening zone.

8. A method executed by a server for generating views of a virtual reality environment for a spectator, comprising,
    receiving, by the server, a feed of a virtual reality environment rendered for a head mounted display (HMD) of an HMD player, the HMD player being provided with an HMD view that is controlled by movement of the HMD by the HMD player, the feed of the virtual reality environment being shared to a website;
    receiving, by the server, a request from the spectator to access the virtual reality environment from the website;
    sending, by the server, a spectator view into the virtual reality environment to a device of the spectator, the spectator view being associated with a viewing spot directed into the virtual reality environment, the viewing spot is decoupled from the HMD view; and
    automatically updating the spectator view to other viewing spots directed into the virtual reality environment as the HMD player moves around the virtual reality environment, which correspondingly moves the spectator view to follow the HMD view in the virtual reality environment;
    wherein the viewing spots are pre-authored viewing spots that are selected to provide views into the virtual reality environment as the HMD player traverses the virtual reality environment, wherein the changes in the HMD view occur during a session as time progresses for said session, and wherein the viewing spot of the spectator view has a delay in being moved to follow the HMD view, and said delay in moving the viewing spot does not delay time progress for said spectator view relative to time progress for said HMD view during said session.

9. The method of claim 8, wherein the spectator is popped from one to another of the pre-authored viewing spots.

10. The method of claim 8, wherein a profile of the spectator identifies a preference for a type of view or content, and the preference is used to select which ones of the pre-authored viewing spots are provided to the spectator.

11. The method of claim 8, wherein the device of the spectator is one of an HMD used by the spectator or a television screen used by the spectator, or a computer screen used by the spectator, or hand-held device screen used by the spectator.

12. The method of claim 8, wherein the spectator is one of a plurality of spectators that provides access to view the HMD view of the HMD player.

13. The method of claim 8, wherein the website provides a selection of options of other HMD views of other HMD players, such that the spectator can select specific ones of the HMD views and see the respective virtual reality environments from one or more spectator views.

14. A non-transitory computer readable medium being non-transitory and having program instructions for generating views of a virtual reality environment for a spectator, the computer readable media comprising:
    program instructions for generating a virtual reality environment to be rendered for a head mounted display (HMD) of an HMD player, the HMD player being provided with an HMD view that is controlled by movement of the HMD by the HMD player; and
    program instructions for providing a spectator view into the virtual reality environment, the spectator view being associated with a viewing spot directed into the virtual reality environment, the viewing spot is decoupled from the HMD view, wherein the viewing spot is one of a plurality of viewing spots selected for the virtual reality environment; and
    program instructions for automatically moving said viewing spot of the spectator view to predetermined viewing spots that follow the HMD view in the virtual reality environment as the HMD view changes responsive to movement of the HMD by the HMD player,
    wherein the changes in the HMD view occur during a session as time progresses for said session, and wherein the viewing spot of the spectator view has a delay in being moved to follow the HMD view, and said delay in moving the viewing spot does not delay time progress for said spectator view relative to time progress for said HMD view during said session.

15. The computer readable media of claim 14, wherein the viewing spot of the spectator view is delayed movement that follows the HMD view, and the viewing spot is one of a plurality of viewing spots that provide different viewing angles that are directed in an area of the HMD view or a direction of movement of the HMD view in the virtual reality environment.

16. The computer readable media of claim 14, wherein the delayed movement of the viewing spot functions to follow the HMD view at a slower rate than movements of the HMD, and the viewing spot is one of a plurality of viewing spots that is preselected for the spectator view based on the HMD view.

* * * * *